United States Patent [19]

Swartzbaugh

[11] Patent Number: 5,384,443

[45] Date of Patent: Jan. 24, 1995

[54] FLUSH CUP EXTENDERS FOR ELECTRICAL DISCHARGE MACHINES

[76] Inventor: Jim Swartzbaugh, 1430 W. Pioneer St., Brea, Calif. 92621

[21] Appl. No.: 8,636

[22] Filed: Jan. 25, 1993

[51] Int. Cl.6 .................. B23H 1/00; B23H 7/02; B23H 1/10
[52] U.S. Cl. .................. 219/69.12; 219/69.14
[58] Field of Search .................. 219/69.12, 69.14; 204/224 M

[56] References Cited

U.S. PATENT DOCUMENTS

| | | | |
|---|---|---|---|
| 4,507,532 | 3/1985 | Inoue | 219/69.12 |
| 4,704,511 | 11/1987 | Miyano | 219/69.12 |
| 5,029,246 | 7/1991 | Suzuki et al. | 219/69.12 |
| 5,057,663 | 10/1991 | Kinoshita | 219/69.12 |
| 5,128,505 | 7/1992 | Matter | 219/69.12 |
| 5,162,630 | 11/1992 | Iwasaki | 219/69.12 |
| 5,214,260 | 5/1993 | Fricke | 219/69.12 |

*Primary Examiner*—Geoffrey S. Evans
*Attorney, Agent, or Firm*—Edgar W. Averill, Jr.

[57] ABSTRACT

A flush cup and flush cup extender for use on electrical discharge machines (EDM). The standard upper and lower flush cups are replaced with improved flush cups which have a threaded portion surrounding the nozzle of the flush cups. Various flush cup extenders can then be threadingly attached to the improved flush cups to provide a shape which is optimum for the workpiece. Flush cup extenders include narrow nozzles, pivotable nozzles, flexible mushroom-domed nozzles, sprinkler nozzles and nozzles with a flat base.

16 Claims, 6 Drawing Sheets

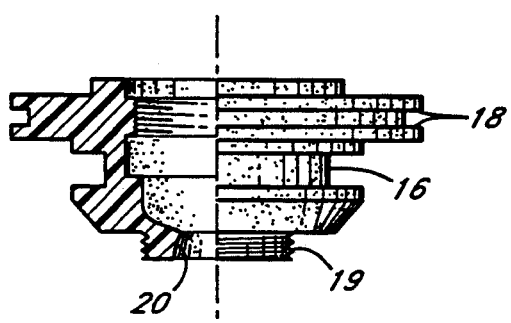
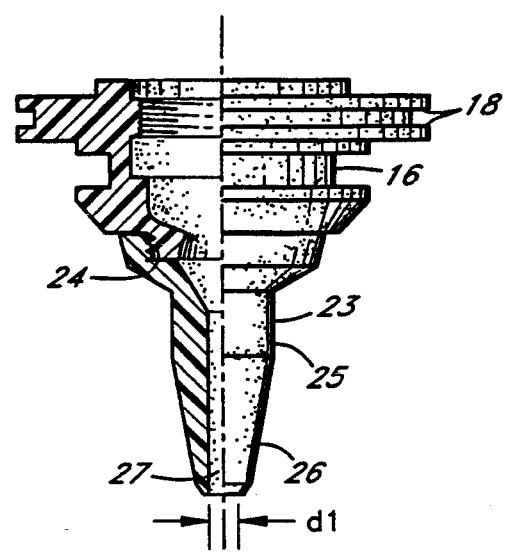
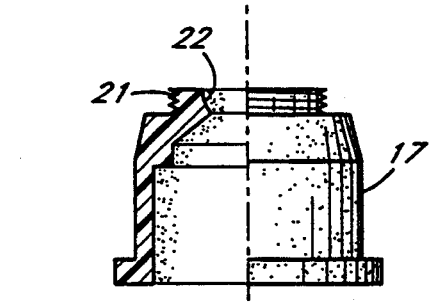
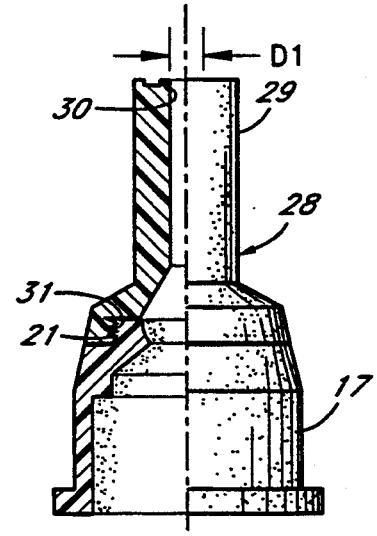
FIG. 3     FIG. 4

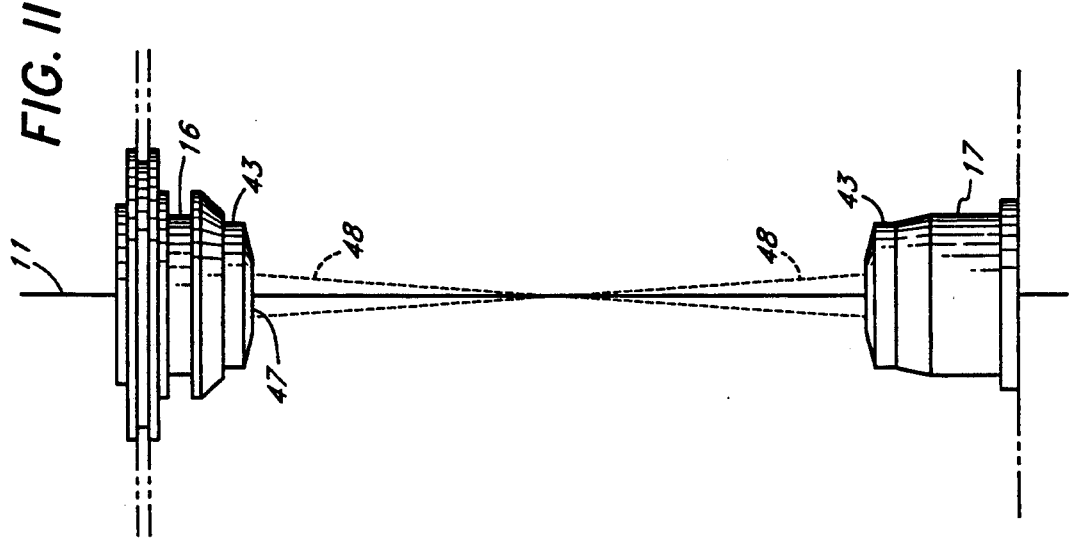
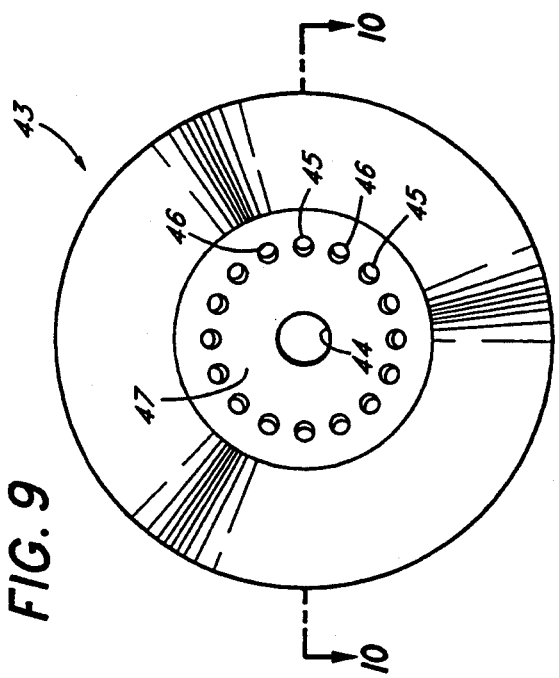
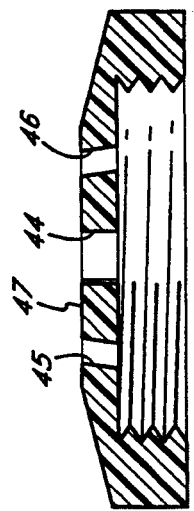

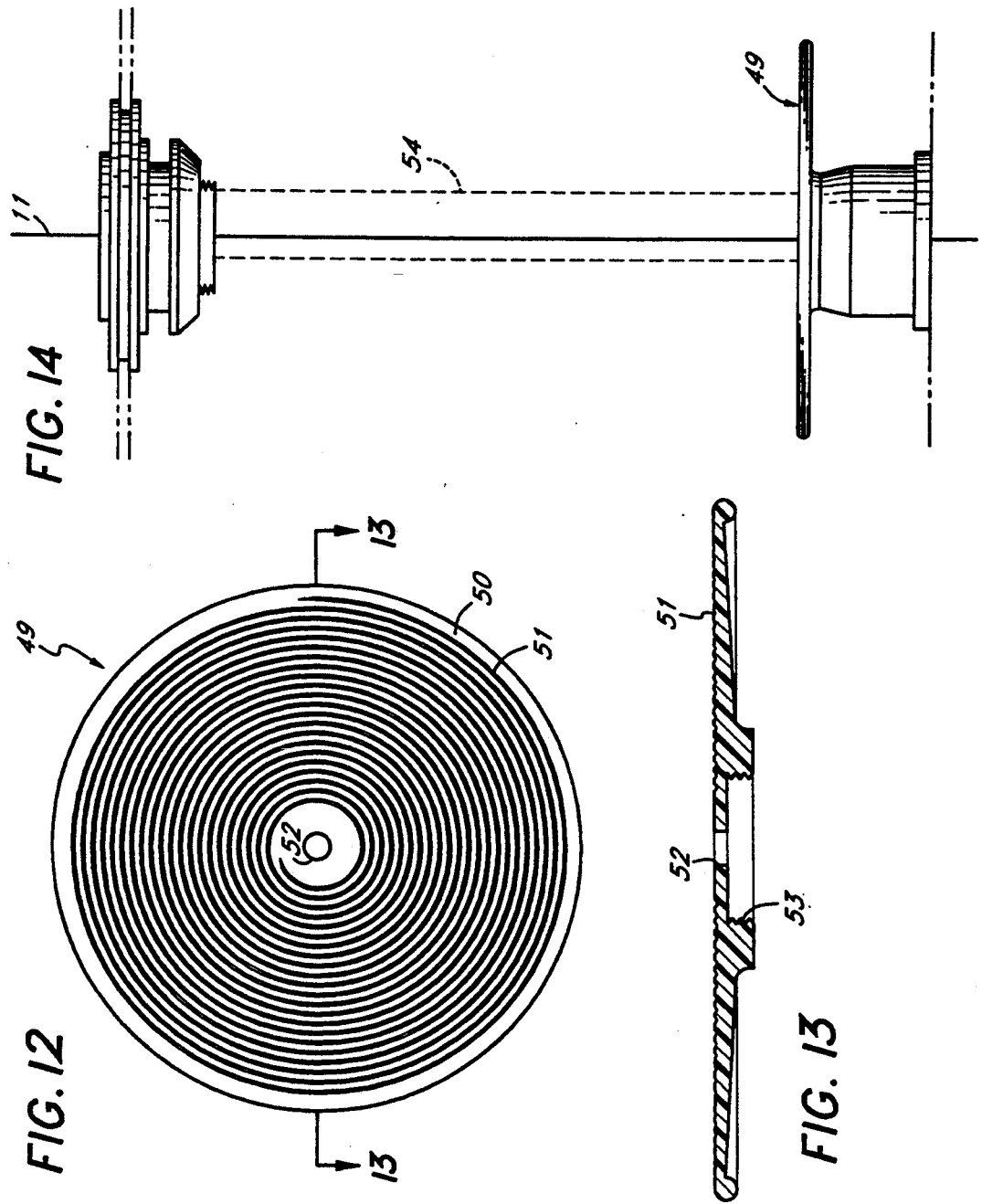

FLUSH CUP EXTENDERS FOR ELECTRICAL DISCHARGE MACHINES

BACKGROUND OF THE INVENTION

The field of the invention is electrical discharge machines, and the invention relates more particularly to improved flush cup and flush cup extenders for use on such machines.

EDM apparatus utilize a moving wire electrode which passes through an upper flush cup and downwardly through a lower flush cup. Flushing fluid, such as deionized water, is introduced into the internal area of the upper and lower flush cups which direct a stream of flushing fluid along the moving wire electrode. This provides cooling as well as a flushing action to remove the eroded metal from the piece being cut.

The normal upper and lower flush cups have a relatively large nozzles through which the electrode passes and have no provision for attachments thereto.

Many workpieces include recesses which divert the flow of flushing fluid and require the cutting speed to be substantially reduced so that the wire will not overheat and part. Even a large flow of flushing fluid is not beneficial if it is almost entirely deflected from the moving wire electrode.

SUMMARY OF THE INVENTION

It is an object of the present invention to provide flush cup configurations which are able to direct the flow of flushing fluid in a more accurate manner. Preferably a plurality of extenders are available for different cutting shapes and situations.

The present invention is for an improved flush cup and flush cup extender. The flush cup has thread means surrounding its nozzle, and a plurality of different hollow flush cup extenders may be affixed to the thread means to provide optimum flushing for the cutting process to be performed. Preferably, the flush cup extender is fabricated from a polymer, and various flush cup extender sizes are disclosed. One such extender is a narrow, generally cylindrical nozzle. Another is a narrow extended nozzle which is held in the flush cup by a socket which permits it to be moved at various angles away from a straight axial direction. Yet another is an extender which has a thin, flexible, curved face with a central opening which permits the flush cup extender to be deflected by contact with the workpiece. Still another extender has a flat, circular face extending outwardly a substantial distance from the nozzle portion. This flat surface preferably has grooves in it to assist in flushing eroded metal from the face of the flat portion.

Yet another extender has a face with a plurality of aimed openings spaced from the central nozzle which direct flushing fluid along the wire electrode at a point spaced from the central nozzle.

BRIEF DESCRIPTION OF THE DRAWINGS

FIG. 3 is a side view partly in cross-section of an improved upper and an improved lower flush cup of the present invention.

FIG. 4 is a side view partially in cross-section of the improved flush cups of FIG. 3 further including an elongated, generally cylindrical nozzle threaded onto the flush cups.

FIG. 9 is a plan view of a flush cup extender with a face which has a plurality of aimed nozzles surrounding a central nozzle.

FIG. 10 is a cross-sectional view taken along line 10—10 of FIG. 9.

FIG. 11 is a side view of the flush cups of FIG. 3 with the extenders of the type shown in FIG. 9 threaded thereon.

FIG. 12 is a plan view of a flush cup extender having a flat, circular face including a spiral groove.

FIG. 13 is a cross-sectional view taken along line 13—13 of FIG. 12.

FIG. 14 is a side view of the flush cups of FIG. 3 having the extender of FIG. 12 affixed to the lower flush cup.

DESCRIPTION OF THE PREFERRED EMBODIMENTS

Figure 2:
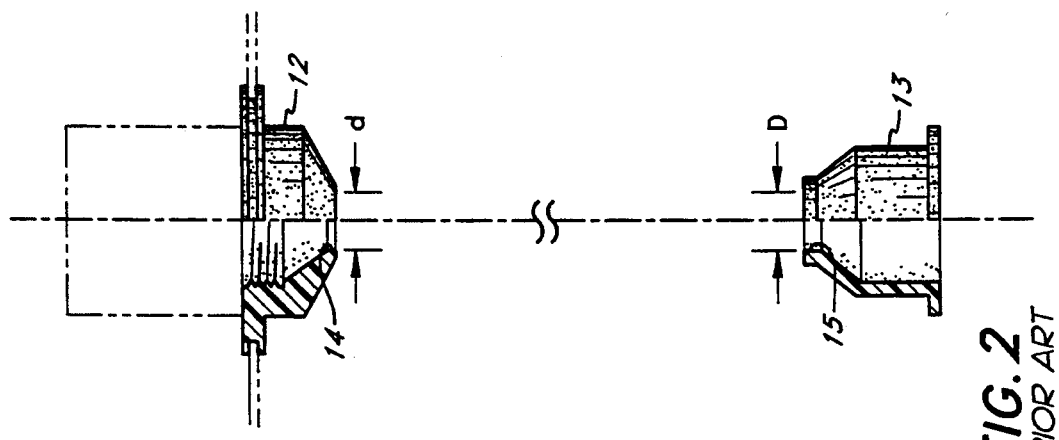
FIG. 2 is an enlarged side view of the upper and lower flush cups partly in cross-section of the EDM of FIG. 1.
Figure 1:
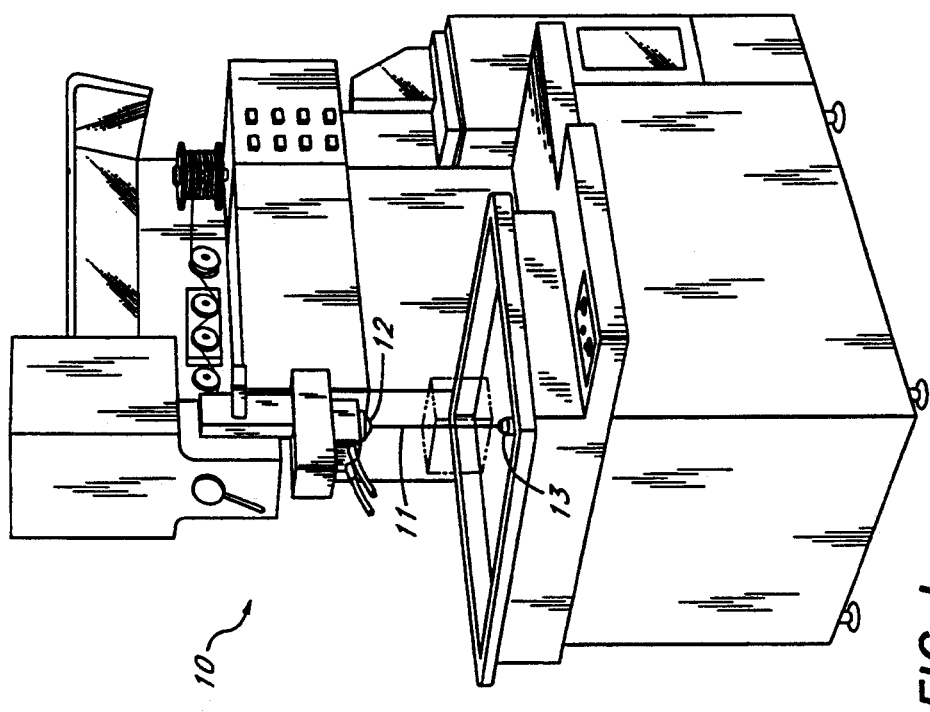
FIG. 1 is a perspective view of an electrical discharge machine (EDM).

An electrical discharge machine is shown in perspective view in FIG. 1 and indicated generally by reference character 10. Such machines are typically referred to as wire EDM apparatus, and that abbreviation will be used herein. Wire EDM machine 10 has a moving wire electrode 11 which moves typically in a downward direction through an upper flush cup 12 and through a lower flush cup 13. A supply of flushing fluid, such as deionized water, is fed to the interior of the upper and lower flush cups and provides cooling and flushing along the moving wire electrode 11. The upper and lower flush cups 12 and 13 are shown in enlarged side view, partly in cross-section, in FIG. 2 where it can be seen that upper flush cup 12 has a nozzle 14 which has an inside diameter "d." Lower flush cup 13 has a nozzle 15 which has an inside diameter "D." Flushing fluid is provided under pressure within the interior of flush cups 12 and 13 and flows out through nozzles 14 and 15 to cool and flush the moving wire electrode.

An improved upper and lower flush cup is shown in side view, partly in cross-section, in FIG. 3. The improved upper flush cup is indicated by reference character 16. Improved upper flush cup 16 has the same standard attachment flanges 18 as upper flush cup 12. Improved upper flush cup 16 also has a male threaded extension 19 to which flush cup extenders may be attached. A socket portion 20 is used in conjunction with extenders of the type shown in FIGS. 5 and 6.

Lower flush cup 17 likewise has a male threaded portion 21 with a socket portion 22. Flush cup 16 and 17 are preferably molded or machined from a polymer such as that sold under the trademark Delrin although it also may be made from polyvinyl chloride, polystyrenes or a metal such as stainless steel or aluminum.

Various flush cup extenders may be screwed onto the threaded extensions 19 and 21, and two such extenders are shown in FIG. 4. The upper flush cup extender 23 has female threads 24 which are threaded onto male threads 19 to provide a leak-proof attachment. Extender 23 has an elongated, generally cylindrical portion 25 which includes a frusto-conical portion 26 which permits the extended nozzle 27 to be brought much closer to many workpieces than the nozzle 14 of the prior art upper flush cup of FIG. 2. The extended nozzle 27 has an inside diameter "d1" which is usually substantially smaller than the diameter "d" of the upper flush cup of FIG. 2. More specifically, common inside diameters for an upper flush cup include 0.093, 0.120 and 0.157, whereas the diameter "d1" is 0.177 inch. This provides a more precise stream of higher pressure flushing fluid than the flush cup of upper flush cup of FIG. 2.

The lower flush cup extender 28 has an elongated, cylindrical portion 29 with an extended nozzle 30 having an inside diameter of "D1." This inside dimension is also about 0.177 inch in diameter. Lower flush cup extender 28 has female threads 31 which are screwed onto male threaded extension 21. Extended nozzles 23 and 28 facilitate reaching around clamps into cavities or other hard to reach places. It should be noted that extenders 23 and 28 are interchangeable. That is, extender 23 may be placed on improved lower flush cup 17, and extender 28 may be placed on improved upper flush cup 16.

Figure 6:
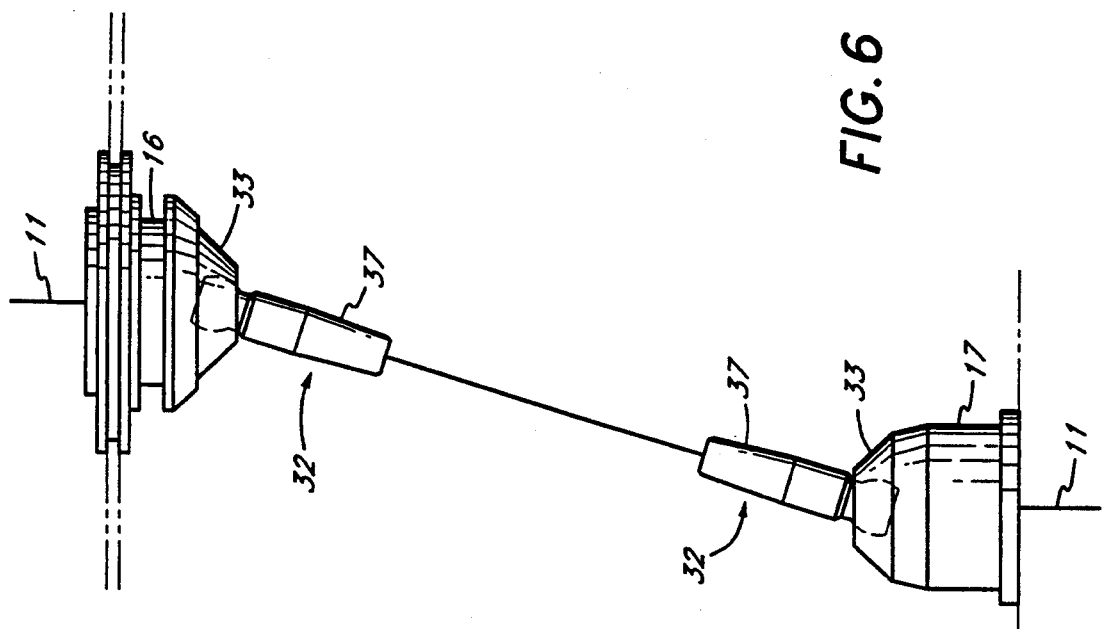
FIG. 6 is a side view of the improved upper and lower flush cups of FIG. 3 together with socket and nozzles of the type shown in FIG. 5.
Figure 5:
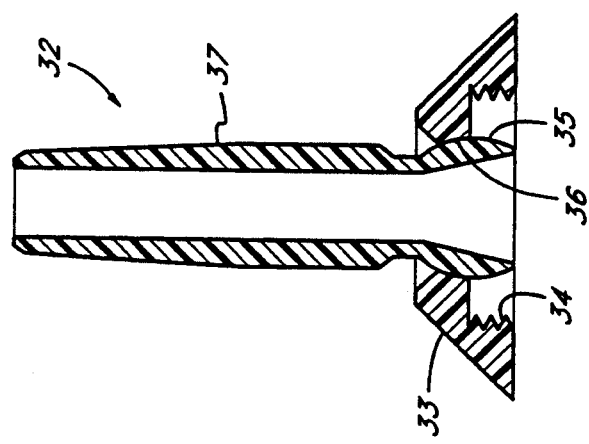
FIG. 5 is a cross-sectional view of a flush cup extender which has a threaded socket portion which may be affixed to the improved flush cup of FIG. 3 together with a nozzle portion which may be deflected from the axial position.

A swiveled flush cup extender is shown in cross-sectional view in FIG. 5 and indicated by reference character 32. Extender 32 has a threaded base 33 including female threads 34. It also has a socketed portion 35 into which ball portion 36 of the nozzle member 37 fits. Ball portion 36 also fits within socket portion 20 or socket portion 22 of the improved upper and lower flush cups 16 and 17 to provide a secure fit. As shown in FIG. 6, the swiveled flush cup extenders are affixed to the improved upper and lower flush cups 16 and 17 which permit the moving wire electrode 11 to be maintained at an angle to accurately provide a cooled and flushed electrode when cutting at an angle.

Figure 8:
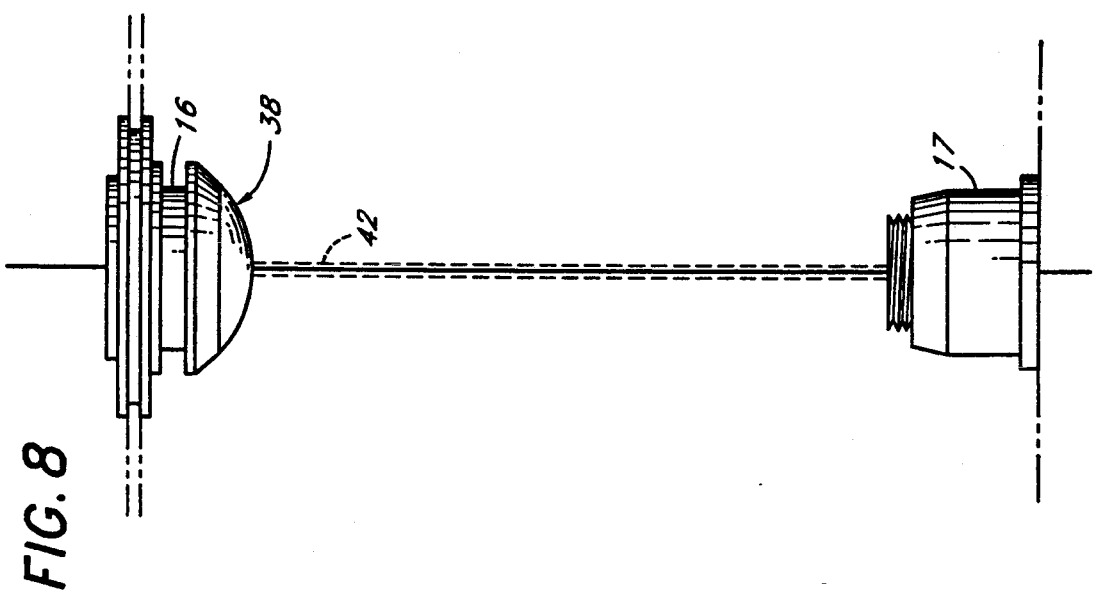
FIG. 8 is a side view of the flush cup extender of FIG. 7 affixed to the upper flush cup FIG. 3.
Figure 7:
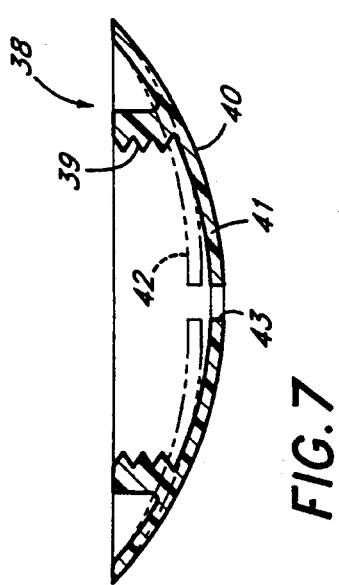
FIG. 7 is a cross-sectional view of a thin, domed flush cup extender.

A mushroom-shaped flush cup extender is shown in FIG. 7 and indicated by reference character 38. Extender 38 has female threads 39 which fit on male threads 19 or 21 of the improved upper and lower flush cups 16 and 17. Mushroom-shaped flush cup extender 38 has a smooth, curved face 40 and a thin wall 41 which permits the wall 41 to be deflected inwardly as indicated by the phantom line 42 so that its central nozzle 43 may be deflected inwardly when contacting a workpiece. Mushroom-shaped flush cup extender is shown affixed to upper flush cup 16 in FIG. 8, and a stream of water, or other flushing fluid, is indicated by reference character. Of course, mushroom-shaped flush cup extender 55 may be affixed to either the upper or lower flush cups. The thin wall actually inflates somewhat from the pressure of flushing fluid within it which further adds to its ability to be deflected.

A sprinkler nozzle flush cup extender 43 is shown in plan view in FIG. 9 and in cross-sectional view in FIG. 10. Extender 43 has a central nozzle 44 and a plurality of sprinkler nozzles 45 and 46 arrayed in a circle or other design about central nozzle 44. Preferable, the sprinkler nozzles are not all aimed at the same angle with respect to the moving wire electrode 11, but are in two or more different angles. For instance, the sprinkler nozzles 45 are aimed to impact the wire electrode 11 four inches from the face 47, and nozzles 46 are aimed to impact electrode 11 two inches from face 47. This directs a flushing spray up or down the side of a workpiece during skim cuts and edge starts and may be used on both the upper and lower improved flush cups. A stream of water from flush cup extenders 43 is indicated by reference character 48 in FIG. 11.

A flat flush cup extender is shown in FIGS. 12, 13 and 14 and indicated by reference character 49. Extender 49 has a flat face 50 into which a spiral groove 51 is formed. The female threads 53, of course, permit attachment to the upper or lower flush cups, and the central nozzle 52 directs a stream of water along wire electrode 11. The flat, close-fitting surface against a flat workpiece is capable of containing the flushing fluid in small cavities creating a minisubmerged condition. The spiral groove helps to direct eroded particles off of flat face 50. A column of water is indicated by reference character 54 in FIG. 14 and would be created by a cylindrical opening of the same shape in a flat-bottomed workpiece. The inner surface of the cylinders, of course, is submerged in water because of the ability of flat face 50 to retain water and prevent it from flowing out of the bottom of the opening of the workpiece (not shown).

While threads are shown as a means of attaching the flush cup extenders to the improved flush cup, other connecting means (thread means) such as a bayonet or snap on connection can, of course, also be used. The improved flush cups of the present invention can, of course, also be used without any extenders at all and the extenders may be added either to the lower, the upper, or both, depending on the shape of the workpiece. By use of the extenders of the present invention, cutting rates can be substantially improved permitting the operator to significantly improve production.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. In an electric discharge machine having an upper flush cup and a lower flush cup for flushing fluid substantially about a wire electrode, said upper and lower flush cups each having a base respectively attached to one of an upper guide and lower guide, said flush cups each extending to form a nozzle at an external end and said flush cups being provided with fluid from a source of fluid, the improvement comprising:

at least one of the flush cups having the nozzle with a surrounding thread means about the nozzle; and a flush cup extender affixed onto the thread means for optimum flushing for a cutting process to be performed, the flush cup extender being selected from a plurality of hollow flush cup extenders having differently shaped extension nozzles.

2. The flush cup extender of claim 1 wherein the selected extender is fabricated from a polymer.

3. The flush cup extender of claim 1 wherein the selected extender has an elongated generally cylindrical nozzle to direct flushing fluid in hard to reach places.

4. The flush cup extender of claim 3 wherein the generally cylindrical nozzle has a frustoconical portion narrowing to a nozzle portion of said extender.

5. The flush cup extender of claim 1 wherein the selected extender has two parts, a threaded portion which includes a socket and a narrowed nozzle portion which has a ball portion held in a moveable manner by said socket whereby the nozzle portion can be aimed at an angle different from the central axis of said nozzle of the flush cup and the nozzle portion of the extender has a cylindrical opening for directing a flushing fluid along the wire electrode.

6. The flush cup extender of claim 1 wherein the selected extender has a thin, flexible curved face extending outwardly from the thread means, and a central nozzle opening is formed in the center of said flexible curved face whereby the curved face may be deflected by contact with the work piece without damaging the curved face.

7. The flush cup extender of claim 1 wherein the selected extender has a flat, circular face extending outwardly a substantial distance from said threaded portion with a nozzle in the center thereof whereby fluid is contained to provide a submerged condition.

8. The flush cup extender of claim 7 wherein said flat, circular face has a flushing groove formed therein.

9. The flush cup extender of claim 8 wherein said flushing groove is a spiral groove.

10. The flush cup extender of claim 1 wherein the selected extender has a face including a central nozzle and a plurality of aimed nozzles to direct flushing fluid along the wire electrode.

11. The flush cup extender of claim 10 wherein the aimed nozzles are directed in more than one angle with respect to the wire electrode.

12. The flush cup extender of claim 11 wherein half the aimed nozzles are aimed at a first angle and the other half of the aimed nozzles are aimed at a second angle.

13. The flush cup extender of claim 12 wherein one half of the nozzles are aimed to direct flushing fluid at a wire electrode at a point about two inches from the central nozzle of said extender and the other half are aimed to direct flushing fluid about four inches from the central nozzle.

14. In an electric discharge machine having an upper flush cup and a lower flush cup for flushing fluid substantially about a wire electrode, said upper and lower flush cups each having a base respectively affixed to one of an upper guide and lower guide, said flush cups each extending to form a nozzle at an external end and said flush cups being provided with fluid from a source of fluid, the improvement comprising:

at least one of the flush cups having the nozzle with connection means surrounding the nozzle; and a flush cup extender affixed onto the connection means for optimum flushing for a cutting process to be performed, the flush cup extender being selected from a plurality of hollow flush cup extenders having differently shaped extensions nozzles.

15. The flush cup extender of claim 14 wherein both the upper and lower flush cups have the nozzle with connection means surrounding the nozzle and wherein the connection means of the upper flush cup is different in size from the connection means of the lower flush cup so that extenders which fit on the upper flush cup will not fit on the lower flush cup.

16. The flush cup extender of claim 15 wherein said connection means on said upper and lower flush cups is a male thread.

* * * * *